United States Patent [19]

Crosbie et al.

[11] 4,243,024

[45] Jan. 6, 1981

[54] G-PROTECTION SYSTEM SENSING A CHANGE IN ACCELERATION AND TILT ANGLE

[75] Inventors: Richard J. Crosbie, Langhorne; Paul R. Edwards, Chalfont, both of Pa.

[73] Assignee: The United States of America as represented by the Secretary of the Navy, Washington, D.C.

[21] Appl. No.: 25,822

[22] Filed: Apr. 2, 1979

[51] Int. Cl.$^3$ .............................................. A61B 19/00
[52] U.S. Cl. ................................ 128/1 A; 128/25 R; 137/38; 434/35
[58] Field of Search ................ 128/1 A, 25 R, 419 C; 137/38; 35/12 H, 12 E; 2/2.1 A

[56] References Cited

U.S. PATENT DOCUMENTS

| | | | |
|---|---|---|---|
| 3,650,277 | 3/1972 | Sjostrand et al. | 128/419 C |
| 3,780,723 | 12/1973 | Van Patten et al. | 128/1 A |
| 4,059,909 | 11/1977 | Kron | 35/12 H |
| 4,164,079 | 8/1979 | Ashworth | 35/12 H |

OTHER PUBLICATIONS

Thesis111—"Modeling of the Human Force and Motion Sensing Mechanisms", Gum, College of Engineering, Ohio State University, Columbus, Ohio, Jun., 1973.

*Primary Examiner*—Robert W. Michell
*Assistant Examiner*—J. L. Kruter
*Attorney, Agent, or Firm*—R. S. Sciascia; Henry Hansen

[57] ABSTRACT

A gravity protective system for pilots including a pressurized suit and a control system therefor for regulating the pressure in the suit in response to variations in acceleration along the thoracic axis of the pilot. Signals indicative of acceleration along the vertical axis of the aircraft and cosine function of the tilt angle of the pilot's seat are combined with a derivative function of their product to produce a control signal for regulating the air pressure within the suit. A threshold control limits regulation to acceleration above a predetermined level, and a feedback circuit from the suit ensures rapid response without oscillation.

9 Claims, 3 Drawing Figures

G-PROTECTION SYSTEM SENSING A CHANGE IN ACCELERATION AND TILT ANGLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to acceleration protective suits for pilots, and more particularly to an inflatable suit for protecting the pilot against the effects of acceleration experienced in high performance aircraft.

When an aircraft is in a sharp turn or climb from a horizontal or upright attitude, as when performing air combat maneuvers, its path describes a curve and the pilot experiences a force due to radial acceleration above the normal level of 1 G. High performance engine-airframe combinations may sustain turns exceeding 8 G's but the tolerance of an erectly seated pilot at these levels is limited both in magnitude and duration of the acceleration. The hydrostatic force on the longitudinal artery complex of the pilot causes blood to pool in the legs and seriously diminish in the head. In addition to discomfort and pain, the pilot may experience unconsciousness or "blackout".

One system for attenuating the effects on the pilot for radial acceleration, is disclosed in U.S. Pat. No. 3,826,434 to Dr. Harald J. von Beckh entitled "Pelvis and Legs Elevating G-Protective Seat", issued July 30, 1974. The tilt of the seat is adjusted about a lateral axis passing through the pilot's head to place his body in a supine position normal to the vertical axis of the aircraft. This system may be used with a conventional type G-suit such as disclosed in U.S. Pat. No. 2,871,849 to J.D. Chatham et al for Body Constraining Suit for Aviators, issued Feb. 3, 1959, wherein the pilot is fitted with a body constraining G-suit that receives compressed air in inflatable bladders to constrain his legs and arms. The inflation pressure is regulated by a control valve solely as a function of the acceleration without regard to its direction and internal variations in suit pressure which may be brought on by bodily functions such as breathing and abdominal muscular activity. That is, the radial acceleration is a turn or climb is generally along the vertical axis Z of the aircraft, and the suit pressure will correspond thereto even though the pilot may be in a reclined position where the amount of G-suit constraint required is not as great as it would be if he were sitting upright. Consequently, the inflation pressure is excessive, and may cause unnecessary discomfort, and impair his performance.

SUMMARY OF THE INVENTION

Accordingly, it is an object of the present invention to provide an improved G-protection system for use in aircraft which provides external body pressure to the pilot for attenuating the effects of high-G maneuvers on the vascular system. Another object of the invention is to provide a G-protection system in which the external pressure applied to the pilot is directly proportional to the acceleration along his thoracic axis. Still other objects of the invention are to provide a G-suit system which is particularly suitable for use with a seat having adjustable angles of recline from an erect position to a supine position, and to provide a G-protection system which accurately and positively responds to sudden changes in acceleration or to internal variations in suit pressure with virtually no time lag. Still another object is to provide a system which is relatively simple to apply to existing aircraft configurations, and which is relatively simple to manufacture and maintain.

Briefly, these and other objects of the invention are accomplished by a novel and improved G-protecting system in which acceleration along the vertical axis of the aircraft and the tilt angle of the seat are measured. The product of the acceleration and the cosine of the measured angle are added to the derivative of the product to produce a signal for regulating the air pressure to an inflatable bladder of a G-suit. A threshold detector prevents changes in the bladder pressure for variations in acceleration below a preselected level, and a feedback circuit from the suit ensures a positive response to the control signal and adjusts for internal variations in suit pressure.

For a better understanding of these and other objects and aspects of the invention, reference is made to the following detailed description taken in conjunction with the accompanying drawings wherein:

DESCRIPTION OF THE PREFERRED EMBODIMENT

Figure 1:
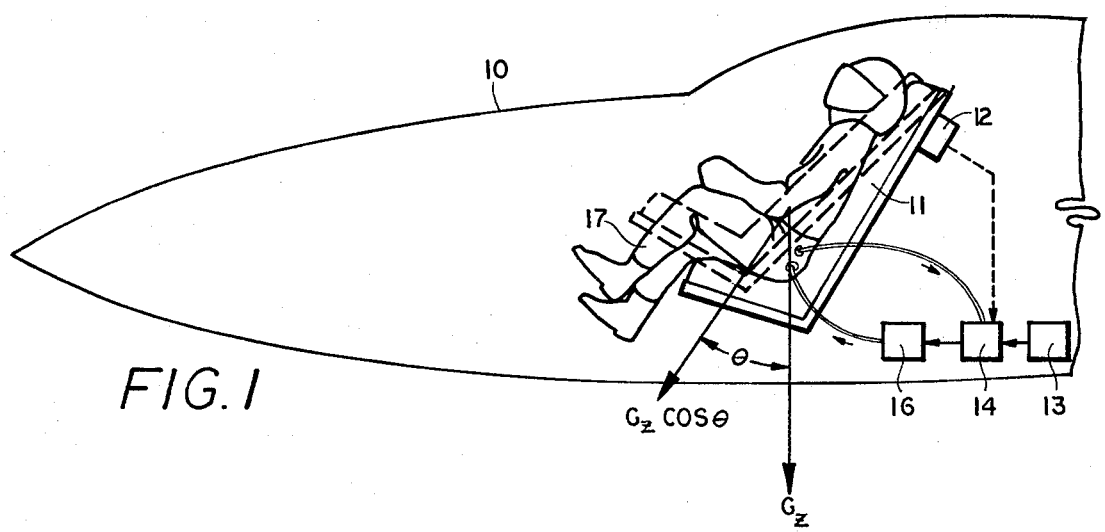
FIG. 1 is a schematic representation of a G-protection system according to the invention as applied to a tiltable pilot's seat in an aircraft.

Referring now to the drawings, wherein like reference characters designate like or corresponding parts throughout the several views, there is illustrated in FIG. 1 the forward section of an aircraft fuselage 10 containing a pilot's seat 11 tiltable about a lateral axis passing approximately through the pilot's head to place him in a reclined position. The tilt angle $\theta$ is the angle subtended by the vertical axis of the aircraft and the thoracic axis of the pilot. As shown in dotted outline in FIG. 1, the tilt angle $\theta$ may be manually or automatically adjusted to enable higher levels of tolerance to the G-force encountered in a sharp turn or climb of the aircraft.

A sensor 12 measures the tilt angle $\theta$ and produces an output signal indicative of the cosine $\theta$; and an accelerometer 13 measures the acceleration G along the vertical axis of the aircraft. A control unit 14 receives these signals for operating a control valve 16 which regulates the air pressure in inflatable bladders in trousers 17 of the pilot's G-suit. The trousers 17 may be of any conventional type in which the inflated bladders will constrain the outer extremities and abdomen of the pilot against distention due to increases in internal blood pressure during acceleration.

Figure 2:
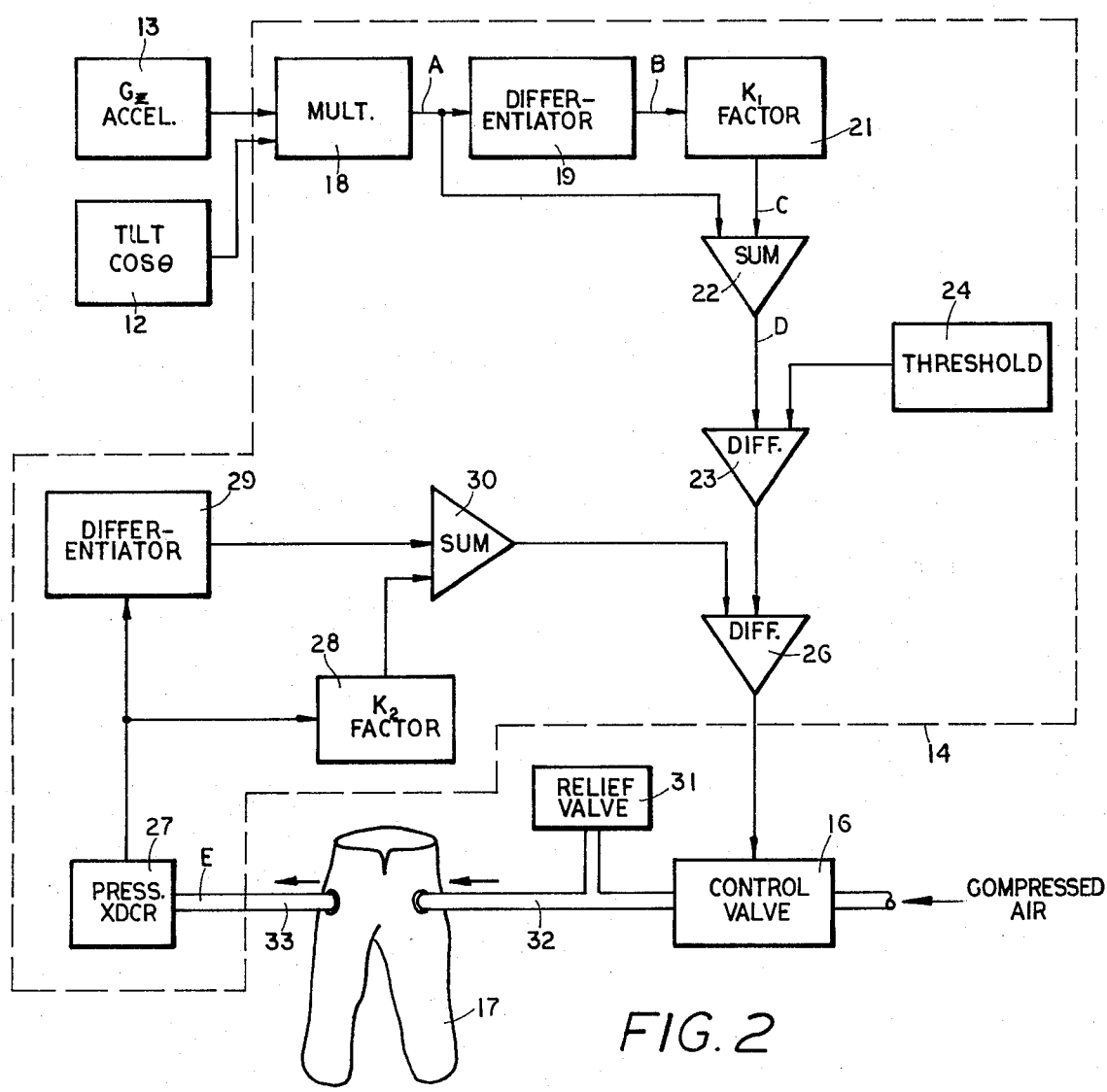
FIG. 2 is a block diagram of the G-protection system of FIG. 1.

As shown in FIG. 2, the signals $G_z$ and cosine $\theta$ received in controller 14 are connected to the input of a multiplier 18 and the product signal A is connected to the input of a differentiator 19 and to one of two inputs of a summing amplifier 22. A derivative signal B with respect to time from differentiator 19 is fed to a $K_1$ factorial unit 21 for producing an output signal C which is then connected to the other input of summing amplifier 22. The signal B compensates for lag in the control circuit, and the value of the factor $K_1$ determines the magnitude of the compensation for optimum response.

The output signal D from amplifier 22 is connected to one of two inputs of a differential amplifier 23 and is prevented from passing through unless it exceeds a predetermined level determined by a threshold signal connected to the other input of amplifier 23. The level of the threshold signal is determined by a threshold unit 24 as the maximum amount of variation in acceleration permitted before control action takes place. The output of amplifier 23 is fed to one of two inputs of a differential amplifier 26 whose output is operatively connected to position control valve 16 to allow compressed air to pass through conduit 32 to the bladders of trousers 17.

The air pressure within trousers 17 sensed through conduit 33 by a pressure transducer 27 whose output signal is indicative thereof is fed to a differentiator 29 and a $K_2$ factorial unit 28. The $K_2$ factorial unit 28 is manually adjusted to set the ratio of pressure in the suit to the acceleration output signal D. The derivative signal with respect to time from differentiator 29 is a damping or stabilizing signal which is summed with the output of unit 28 by summing amplifier 30. The other input of amplifier 26 receives the output of amplifier 30 as a feedback signal for nulling signal from amplifier 23 when the system is in balance.

A relief valve 31 connected in the conduit 32 ensures that the pressure in trousers 17 does not exceed a predetermined amount.

Figure 3:
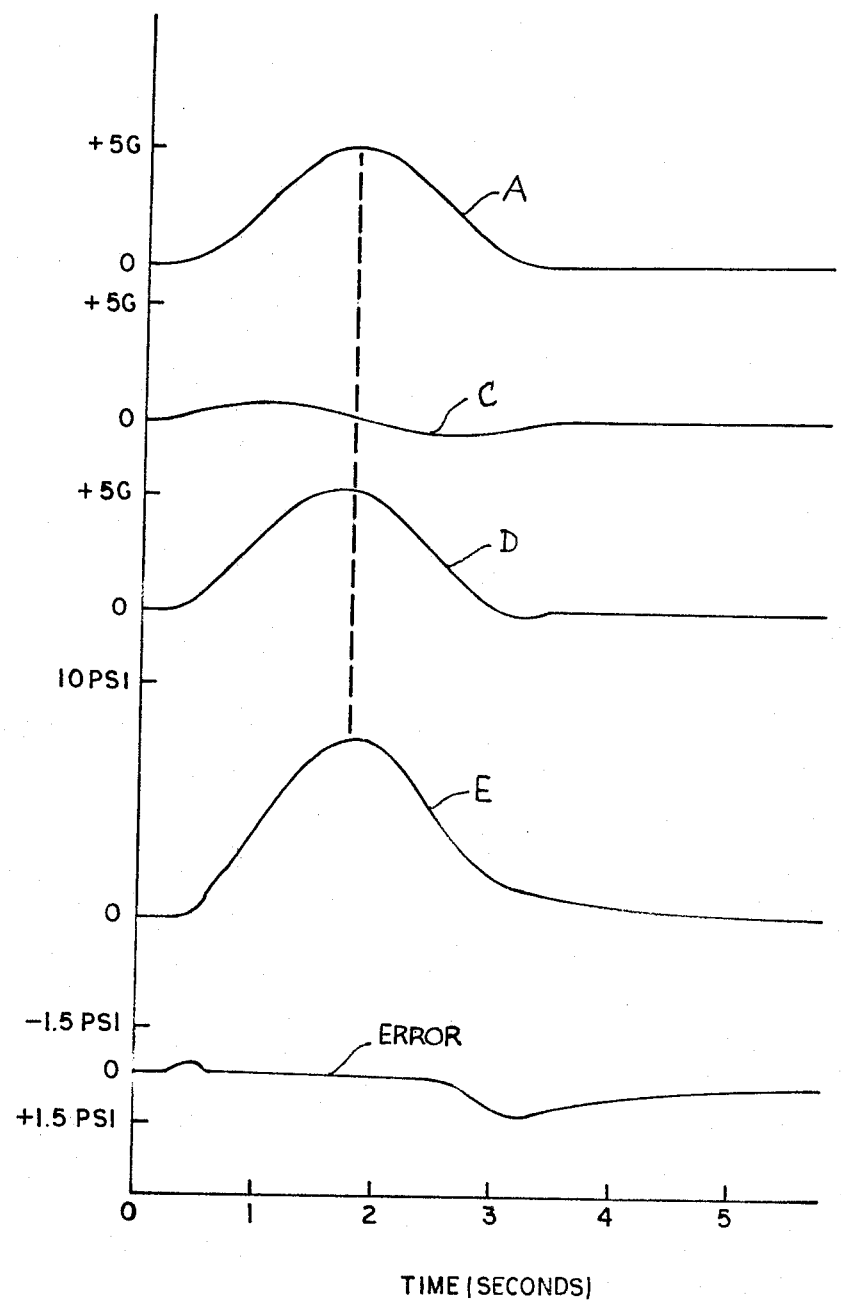
FIG. 3 is a graph of typical response signals occurring during operation of the system of FIG. 1.

Operation of the G-protective system according to the invention is summarized as follows. Assuming the pilot is in level flight and commands the aircraft into a turn and then returns to level flight, the signals shown in FIG. 3 are representative of the system response. That is, for a vertical acceleration $G_z$ and a given seat tilt $\theta$, the acceleration along the thoracic axis of the pilot, $G_z$ cosine $\theta$, is represented by signal A. Differentiator 19 and $K_1$ factorial unit 21 in combination produce the signal C which is added to signal A to produce signal D. Assuming that signal D exceeds the threshold level, the output is transmitted through differential amplifiers 23 and 26 to effect regulation of control valve 16 to produce a pressure variation in trousers 17 shown by signal E. As evidenced by the error signal in FIG. 3, the pressure variation in the suit is substantially in phase with the change in acceleration force along the thoracic axis of the pilot. If the tilt angle $\theta$ is increased, the magnitude of the pressure change in the suit will decrease. In addition, internal variations in the suit pressure, brought on by breathing for example, will cause the control valve to respond accordingly to maintain the desired suit pressure.

Some of the many improvements and novel features of the invention should now be readily apparent. For example, a G-protection system is provided which compensates the pressure within an inflatable type G-suit for variations in the posture of the pilot. Irrespective of his position, reclined or erect, the suit pressure will correspond to the acceleration force along the thoracic axis of the occupant thereby precluding the occurrence of excessive G-suit pressures, particularly when the occupant approaches a supine position normal to the vertical axis of the aircraft. It is particularly suited for automatic operation in aircraft where the seat is automatically tilted in response to increases in acceleration along the vertical axis of the aircraft. The G-protection system of the present invention also accurately and positively responds to sudden changes in acceleration with virtually no time lag. This is brought about because the control system responds to the pressure requirements of the suit itself, and not to the supply line pressure of the control valve. For example, the suit pressure during a transient phase of the acceleration profile is substantially reduced below the required pressure, and the system thereby compensates for this by overdriving the control signal. Furthermore, the system is relatively simple to adapt to existing high performance aircraft configuration, utilizes conventional components, and is simple to manufacture and to maintain.

Obviously, many modifications and variations of the invention are possible in light of the above teachings. It is therefor to be understood that within the scope of the appended claims the invention may be practiced otherwise than as specifically described.

What is claimed is:

1. A G-protection system for the occupant of an aircraft, comprising in combination:
   a seat for supporting the occupant in the aircraft;
   sensor means, said means connected to said seat for producing a first signal indicative of the product of acceleration along the vertical axis of an aircraft and the cosine of the angle subtended by said axis with the thoracic axis of the occupant;
   a source of fluid pressure;
   control means connected to receive said first signal and said source for producing a regulated fluid pressure; and
   a G-suit connected to receive said regulated fluid pressure for constraining the occupant against body distension caused by the acceleration.

2. A G-protection system according to claim 1, wherein said control means further comprises:
   first differentiator means connected to receive said first signal for producing a second signal indicative of the derivative of said first signal;
   first summing means connected to receive said first and second signals for producing a third signal indicative of the sum thereof; and
   valve means connected to receive said third signal for producing said regulated fluid pressure.

3. A G-protection system according to claim 2 further comprising:
   feedback means connected to said G-suit and said first summing means for producing fourth signal modifying said first signal in response to the pressure in said G-suit.

4. A G-protection system according to claim 3 further comprising:
   threshold means for producing a fifth signal connected to said first summing means for inhibiting said first signal when below a predetermined level.

5. A G-protection system according to claim 3 wherein said feedback means further comprises:
   a pressure sensor for sensing the pressure in said G-suit for producing a sixth signal indicative thereof;
   second differentiator means connected to receive said sixth signal for producing a seventh signal indicative of the derivative of said sixth signal; and
   second summing means connected to receive said sixth and seventh signals for producing said fourth signal.

6. A G-protection system according to claim 5 further comprising:

first factorial means connected to said first summing means for adjusting the ratio of said second and third signals.

7. A G-protection system according to claim 6 further comprising:
second factorial means connected to said second summing means for adjusting the ratio of said sixth and seventh signals.

8. A G-protection system according to claim 7 wherein said seat is tiltable about an axis transverse to the fuselage of the aircraft.

9. A G-protection system according to claim 8 wherein said sensor means further comprises:
a tilt angle sensor for generating an eighth signal indicative of the cosine of the angle subtended by the vertical axis of the aircraft and the tilt of said seat;
an acceleration sensor for generating a ninth signal indicative of the acceleration along the vertical axis of the aircraft; and
multiplier means connected to combine said eighth and ninth signals to produce said first signal.

* * * * *